UNITED STATES PATENT OFFICE.

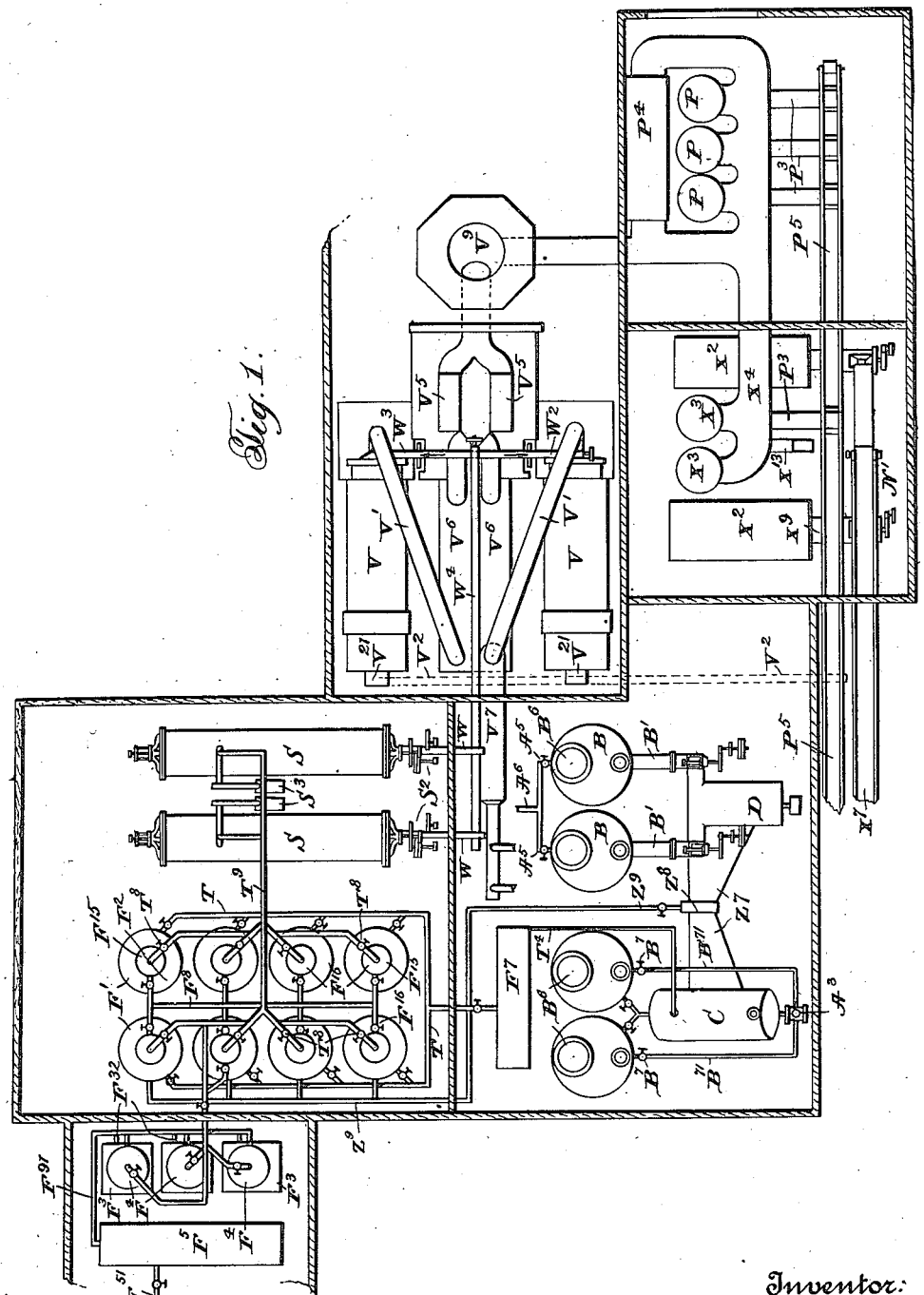

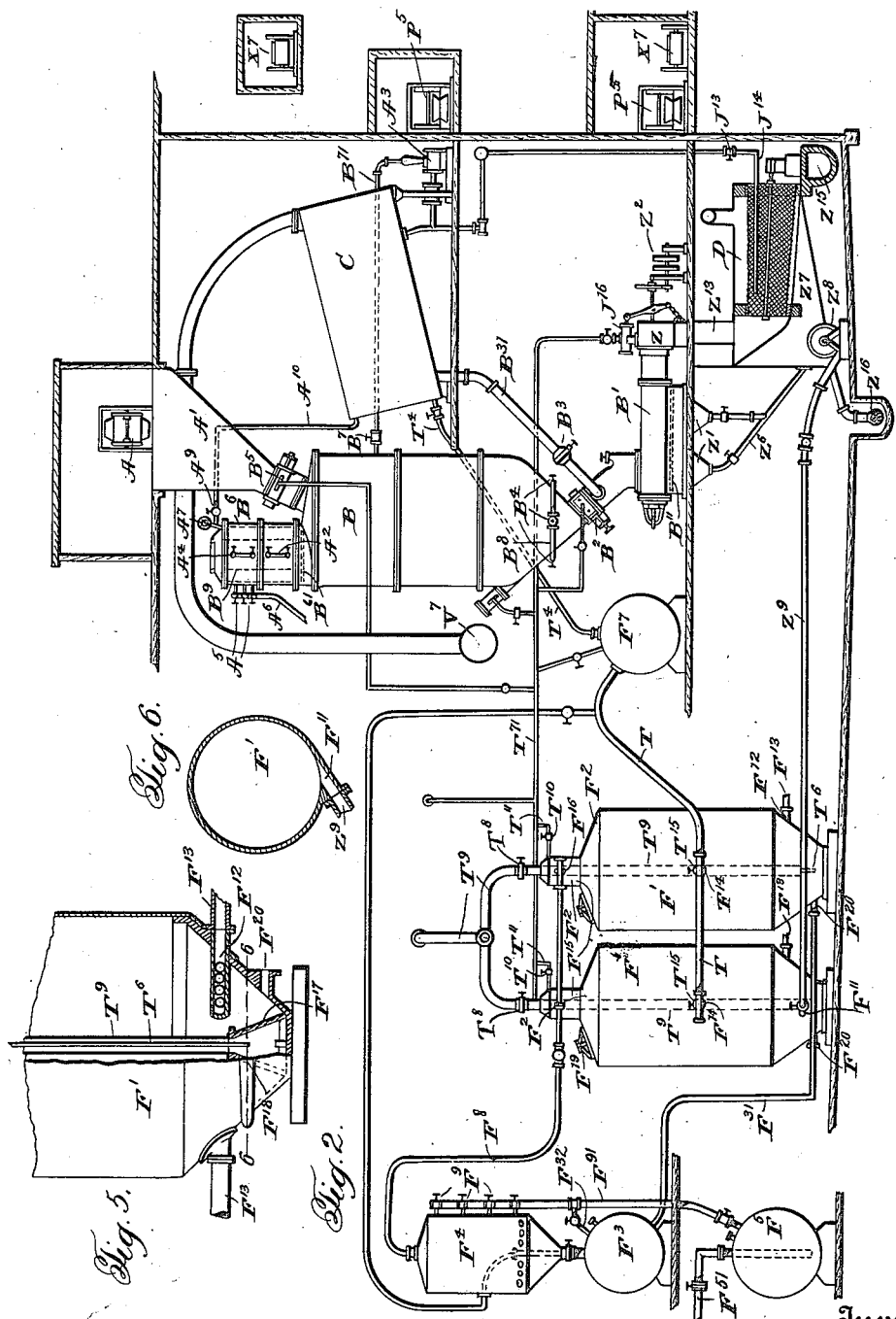

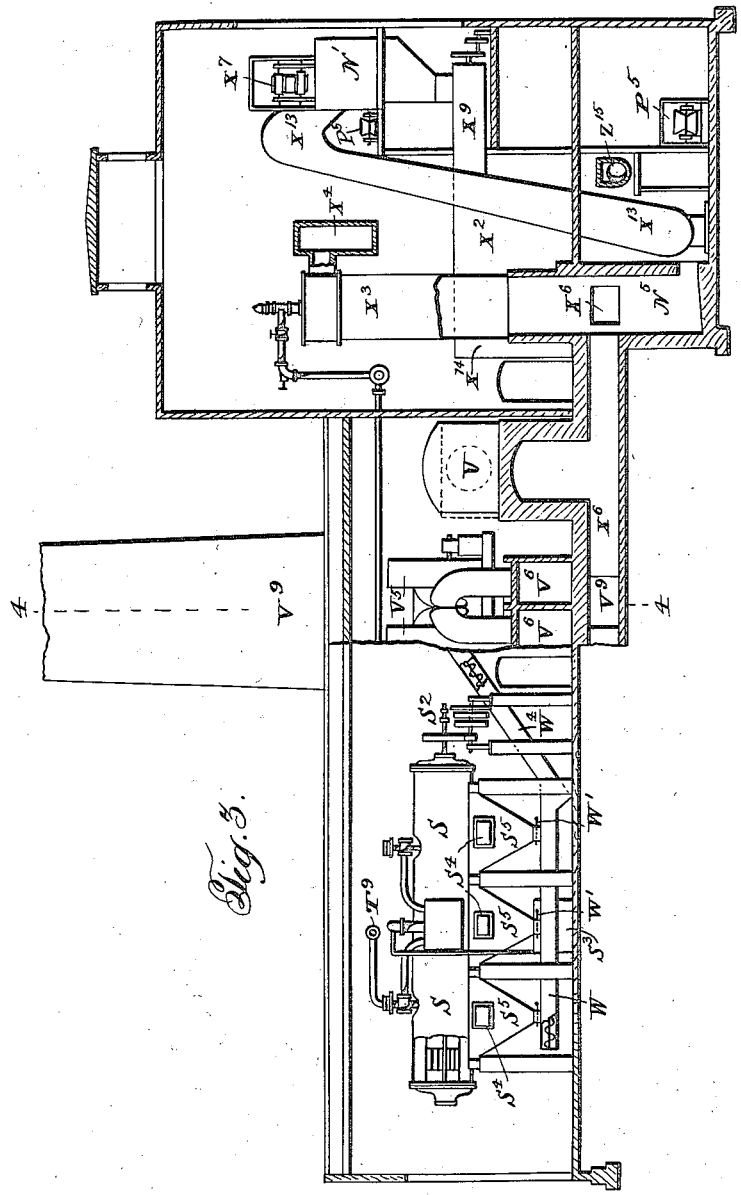

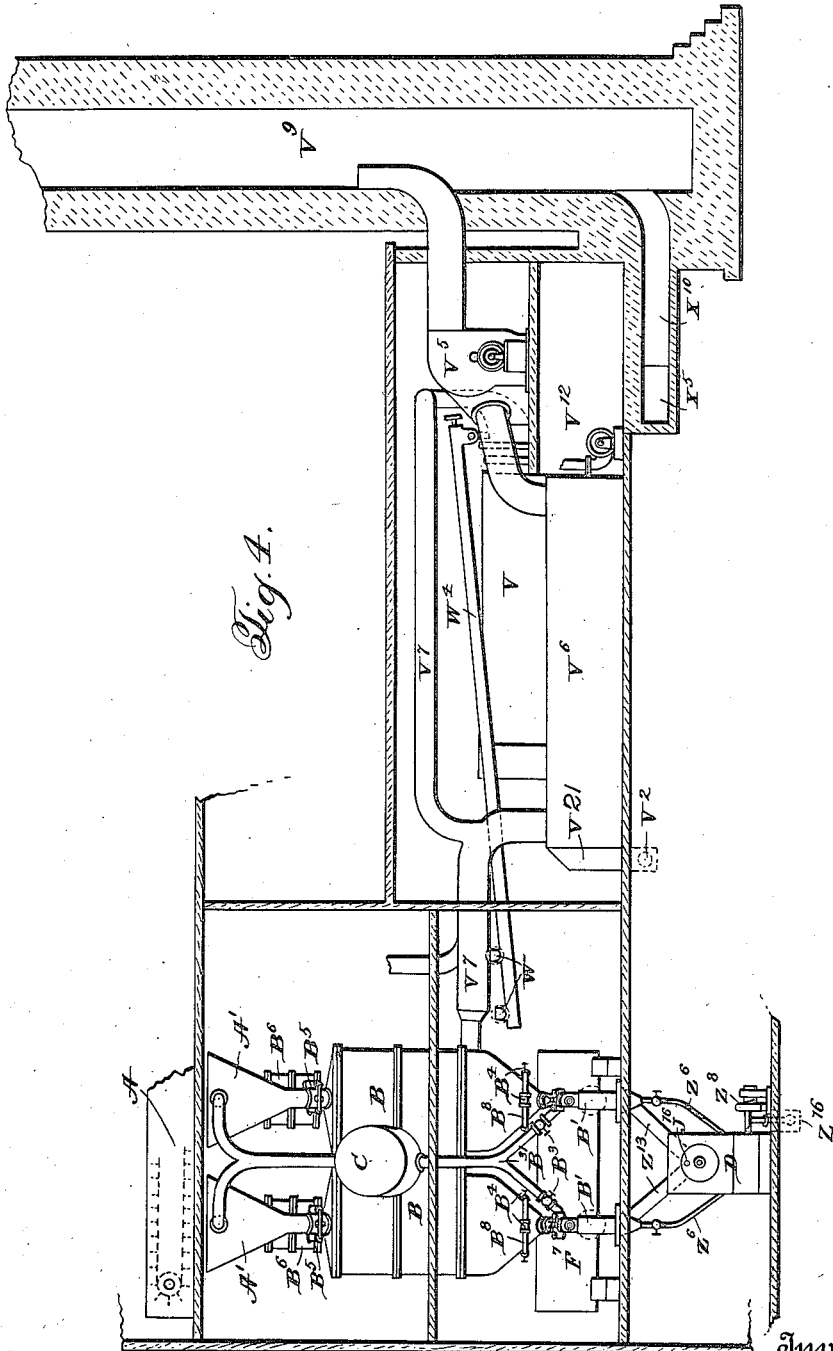

CHARLES S. WHEELWRIGHT, OF PROVIDENCE, RHODE ISLAND.

PROCESS FOR REDUCING MATTER CONTAINING GREASE OR OIL.

1,193,743.

Specification of Letters Patent.

Patented Aug. 8, 1916.

Application filed May 14, 1912. Serial No. 697,292.

*To all whom it may concern:*

Be it known that I, CHARLES S. WHEELWRIGHT, a citizen of the United States, residing at Providence, in the county of Providence and State of Rhode Island, have invented certain new and useful Improvements in Processes for Reducing Matter Containing Grease or Oil, of which the following is a specification.

This invention relates to a process for the reduction of garbage, offal or other like material, and contemplates broadly the cooking and recovering of grease, oil and other marketable matter from said material and a destruction of the remainder, the process to be carried on continuously and the material at all times to be contained or conveyed in closed tanks and conduits. In this process noxious gases and offensive odors are conducted away through the smoke stack of the power plant and do not escape about the premises.

This invention covers improvements in processes in this same art as set forth in my Patents Nos. 774,805, November 15, 1904; 774,807, November 15, 1904 and 925,971, June 22, 1909, with particular reference to the latter and the patents referred to therein, in which the construction and mode of operation of the garbage cooking vessel or digester, extractor, hot water supply tanks, trap tanks, separators, muck tanks and accessories are fully described.

Other objects and the novel features of the invention will be apparent from the following description taken in connection with the drawings, in which I disclose a typical apparatus for carrying out the improved process.

Figure 1 is a plan view of the apparatus employed in the continuous and confined operation of the process, showing one of the batteries of digesters having the tank C connected therewith, and showing an extractor and screen connected to another battery; Fig. 2 is a view in elevation of the same, with parts in section, showing only the apparatus for the removal of the rubbish and separation of the grease and oil and water; Fig. 3 is a view showing the apparatus for drying the tankage, condensing the vapors, and the rubbish bin, destructor and accessories; Fig. 4 is a sectional view along the line 4—4 of Fig. 3, with parts shown in elevation, presenting another view of the digester unit and rubbish-separating mechanism including the driers, coolers and condensers, and ventilating fan; Figs. 5 and 6 are detail views of the lower end of one of the trap tanks F', Fig. 6 being a sectional view of the conical head taken along line 6—6 of Fig. 5.

Referring now to the drawings, the digester B is of the form generally employed in my patents previously referred to and is provided in its lower conical end with discharge opening controlled by the valve $B^2$. Steam for the cooking operation is conducted from steam generating boilers to a steam pipe $B^8$ surrounding the lower conical end and communicating with the interior of the digester at a plurality of inlets controlled by valves $B^4$. The upper conical end of the digester B has two openings therein. One opening controlled by the valve $B^5$ constitutes the inlet and communicates directly with a hopper $A^1$ disposed above the same and into which the fresh or green garbage is dumped by a conveyer A. The conveyer housing tank and digester inlet are fitted together so that there will be no leakage or escape of offensive gases except by a draft through a pipe connected to a specially arranged ventilating system. Communicating with the other opening in the head of the digester B is secured a filter dome $B^6$ which is in some respects similar to the form shown and described in my Patent No. 774,805. The said dome is provided with a strainer or filter $B^{61}$ and a concentric stand pipe or vomit pipe $B^9$. The pipe $B^9$ is of somewhat smaller diameter than the internal diameter of the dome thereby forming an annular space between the same and the shell of the dome into which the grease, oil and water may be carried. The said annular space is open only at the top, grease, etc., running over the top of pipe $B^9$ into the same. Secured to the outer side of the dome at some convenient place are the usual water glass $A^2$ and oil glass $A^4$ for indicating the height of the liquid and the pressure gage $A^7$. Valves $A^5$ control outlets at different heights on the dome, which outlets are connected to a common pipe $A^6$ which conducts the oil and grease to the grease-settling tanks $F^4$. The dome $B^6$ is connected to a hot-water tank C by means of a pipe $A^{10}$ controlled by a valve $A^9$, which allows the escape of gas to the hot-water tank C when the valve is open.

Hot water may be supplied to the tank C from the boiler plant but when the apparatus is in operation the clear liquor from the trap tanks $F^1$ and other grease-settling tanks will be drawn off from the latter and returned to a reservoir or return hot liquor tank $F^7$, to be discharged into the hot-water tank C and used again and again through the process, liquor enough being left with the separated tankage to move the same through the conduits by air pressure. Any accumulation of liquor not needed to carry through the process is evaporated, as will be hereinafter explained. A pump $A^3$, connected by pipe $B^{71}$ to the side of the digester B may supply hot water or liquor to the latter when the valve $B^7$ controlling said pipe is opened. The pipe $B^{31}$, controlled by valve $B^3$, is connected to discharge hot water or liquor from the tank C into the digester B when valves $B^2$ and $B^3$ are open and also may discharge hot water or liquor into the extractor $B^1$.

The extractor $B^1$ is in some respects similar in construction to the extractors shown and described in my previous patents, but has a different function. Heretofore it has been the practice to pass all waste matter, including the valuable tankage, out of the plug end of the extractor, drying the same and separating the tankage from the waste extraneous matter such as rubbish and similar foreign material which includes tin cans, rags, iron, wood, etc. This practice has been found to be impracticable for the reason that in the process of separation fires have resulted and other obstacles have been encountered. To avoid the necessity of making the mechanical separation referred to I admit a large quantity of hot water or liquor from tank C by pipe $B^{31}$ to the extractor $B^1$ when the material has been discharged into the latter from digester B. The result is that the contents of the extractor are so thinned down that nearly all of the fine and valuable tankage with the liquid passes through the perforated plates $B^{11}$ in the bottom of the extractor, having been washed from the objectionable matter or rubbish. The latter is carried out of the extractor through the plug Z and spout $Z^{13}$ by means of the extractor screw, not shown, as described in my patent referred to, and is then discharged onto a wet screen D which is revolubly mounted in an air-tight and water-tight container comprising a receiving compartment $Z^7$. A spray or shower pipe $J^{14}$, connected to pump $A^3$ and tank C, is controlled by valve $J^{13}$ and delivers hot water or liquor to the screen D to wash from the rubbish the tankage adhering thereto.

The water and tankage from screen D flows into compartment $Z^7$ and mingles there with the other pulp-like material which passes through the extractor plates $B^{11}$, receiver $Z^1$ and pipe $Z^6$. The combined liquor and tankage is then forced by centrifugal pump $Z^8$ in a very liquid pulpy state through pipe $Z^9$ to trap tanks $F^1$.

Trap tanks $F^1$ are made up of a cylindrical portion having conical heads, the lower end or head having an inlet $F^{20}$ and $F^{11}$ to which the tankage conduit $Z^9$ is connected. The upper conical end is provided with a dome $F^2$. A steam coil $F^{12}$, supported within the lower conical head, communicates with the steam pipe $F^{13}$, connected to a steam supply, not shown. The cylindrical wall has an outlet $F^{14}$, connected to a return hot liquor tank or reservoir $F^7$ by means of pipe T. The connection of the said spent liquid discharge $F^{14}$ to the pipe T is controlled by valve $T^{15}$. The tank $F^7$ is provided with compressed air supply for forcing out the contents thereof and is connected to hot water or liquor tank C by means of pipe $T^4$.

The upper head of the tank $F^1$ has mounted thereon a dome $F^2$ which is provided with a grease outlet connected by pipe $F^8$ to the grease-settling tanks $F^4$. The upper end of the dome admits the pipe $T^9$ which extends down into the lower conical end of the tank and rests upon a supporting member $F^{17}$. To agitate and discharge the matter from the tanks I provide compressed air inlets $T^{11}$, controlled by valves $T^{10}$, and pipe $T^6$, extending down close to the bottom of the tank. The pipe $T^6$ is disposed within the pipe $T^9$ and extends closer to the bottom than the latter. The pipe $T^6$ is connected to a compressed air supply through pipe $T^{71}$.

Grease drawn from dome $B^6$ and the grease discharge $F^{16}$ is conducted to the grease-settling tanks $F^4$. The said tank $F^4$ is provided with a series of valved outlets $F^9$ disposed at various heights therein, which communicate with the pipe $F^{91}$, the latter discharging into a grease storage tank $F^5$, disposed below the tank $F^4$ and provided with a valve outlet $F^{51}$. A muck tank $F^3$ is disposed beneath the tank $F^4$ and above tank $F^5$ to catch the matter settling from tank $F^4$ which after settling is returned to the trap tank $F^1$ through pipe $F^{31}$ and inlet $F^{20}$. The top of the muck tank $F^3$ has a valved outlet therein which communicates by pipe $F^{32}$ with the pipe $F^{91}$ to permit the withdrawal of grease therefrom and the discharge of the same into the storage tank $F^5$. Both the tanks $F^3$ and $F^5$ are provided with compressed air inlets for the purpose of forcing out the contents thereof and the tank $F^4$ is provided with a steam coil to heat the container to aid in the separation and removal of grease or oil from the contents of the same.

Pipe $T^9$ connected to the trap tanks $F^1$ discharges into the evaporators S, as shown in Figs. 1 and 3. The said evaporators are of double shell construction so that they may always be kept at a high temperature. Lifts or agitators, confined within the inner shells, are continually kept in motion by power from driving gears $S^2$. A vacuum pump $S^3$ is connected to the shells to reduce the pressure within the same and accelerate evaporation. Hopper casings $S^5$ connected directly to the outer shell are provided with doorways $S^4$ through which discharge doors, not shown, in the bottom of the shell S may be opened and the material from the said evaporator shell may be discharged into the hoppers $S^5$. The lower ends of the hoppers $S^5$ are provided with sliding gates. Connected to the hoppers $S^5$ at their lower ends is a closed screw-conveyer casing W, having a screw-conveyer therein. Communication between the hoppers $S^5$ and the conveyer casing W is controlled by sliding gates $W^1$. The screw-conveyer in casing W discharges into an inclined screw-conveyer casing $W^4$, which latter discharges into other conveyer casings $W^2$ and $W^3$, having conveying screws therein traveling in opposite directions and discharging into driers V, as shown in Fig. 1. The driers V have discharge outlets $V^{21}$ (see Fig. 4), which communicate with a conveyer casing $V^2$, the conveyer therein discharging into conveyer $P^5$. The driers V are provided with a furnace and so arranged that heat may be supplied by the use of coal in their own furnace or by a by-pass flue $X^6$ from rubbish burners $X^2$, as will be hereinafter explained. The vapor and gases in the driers are exhausted therefrom through the conduits $V^1$ into coolers or condensers $V^6$, by means of the fans $V^5$, which latter exhaust into the chimney $V^9$. A pump $V^{12}$ supplies water for the condenser and cooler. The main ventilating pipe $V^7$ which has branches throughout the buildings in which the apparatus is installed is also connected to the condenser $V^6$, by means of the fans $V^5$, which latter exhaust into the chimney $V^9$.

$X^2$ represents a rubbish destructor which furnishes the heat for the operation of upright steam boilers $X^3$ and may also furnish heat for the operation of the driers V. The steam boilers $X^3$ furnish the steam and hot water required in the operation of the process.

$X^4$, $X^5$ and $X^6$ are flues, $X^6$ being a by-pass flue from rubbish burner $X^2$.

$X^7$ is a conveyer for moving rubbish to the rubbish bin $N^1$.

$X^9$ is a mechanism for charging rubbish into the rubbish destructor $X^2$.

$X^{13}$ is a conveyer for removing material from ash-pit $N^5$ into a chute, not shown, for removing indestructible matter including ashes, tin cans, iron, etc.

$X^{14}$ constitutes the combustion chamber for the rubbish destructor $X^2$.

P are auxiliary steam boilers fed by coal chutes $P^3$.

The main features of the apparatus having been described, the operation and working of the process is as follows: The garbage or like material having been delivered into hoppers $A^1$ from conveyer A, all outlets from extractor $B^1$ are closed and the digester B is made ready for the charging by opening discharge valve $B^2$ and valve $B^3$. The hot water tank C is thereby connected with the digester B and the cone of the latter is filled with return hot liquor and valve $B^2$ is closed. Steam is then applied at the bottom of the cone by opening valves $B^4$ and the liquor is kept at a boiling point while charging the digester through valve $B^5$. When charged, valve $B^5$ is closed and more steam is turned on to raise the pressure as quickly as possible to approximately 25 lbs., indicated by pressure gage $A^7$ and this pressure maintained throughout the time of cooking, which is about three hours.

If the liquor does not appear in the glass $A^2$ during the time of cooking, return liquor from hot-water tank C is forced into the digester at $B^7$ by means of pump $A^3$ until glass $A^4$ indicates the level of the liquor in the dome $B^6$. The pump $A^3$ is then stopped and the water including the water of condensation, as it increases carries with it the grease as given up through the vomit pipe $B^7$ and the grease and water so accumulating in dome $B^6$ is drawn off by valves $A^5$ and discharged into pipe $A^6$ leading into the grease-settling tanks $F^4$, which operation is continued so long as any grease is shown in the dome $B^6$ by glass $A^4$. During the cooking the valve $A^9$ is open in pipe $A^{10}$, allowing the gas in the top of the dome $B^6$ to be blown down and discharged into hot-water tank C during the process of cooking. When the process of cooking is finished the valves $B^4$ at the bottom are closed and the pressure is applied to another digester being charged or about ready to cook. The pressure on digester B being relieved to a great extent, the extractor $B^1$ is then made ready to receive the contents of the digester by closing plug valve Z and valves in pipes leading from receivers $Z^1$. Discharge valve $B^2$ is open and power is applied to the driving gear $Z^2$ to operate the extractor screw within the extractor. Then the valves at receiver $Z^1$ are opened and valve $B^3$ is opened, allowing the return liquor to flow from hot-water tank C into extractor $B^1$. As the contents of the digester is received the tankage and liquor from the same passes through the perforated plates $B^{11}$ at the bottom of the extractor $B^1$ through receivers $Z^1$ and flows through pipe $Z^6$ into the receiving tank $Z^7$ to be charged by the pump $Z^8$ through discharge pipe $Z^9$ into trap tank $F^1$. The matter passing through perforated plates is in a very liquid pulpy condition, practically all of the valuable tankage passing through the perforations at the bottom of the extractor.

The rubbish remaining in the extractor and such tankage as adheres thereto forces the plug Z of the extractor off its seat and discharges the rubbish into spout $Z^{13}$ and into the revolving wet screen D where the shower pipe $J^{14}$ sprays return hot liquor from tank C on to the said rubbish, washing the adhering tankage therefrom and down through the screen into the tank $Z^7$, where it mingles with the tankage discharge from pipe $Z^6$ and is conducted into trap tanks $F^1$ along with said tankage. The rubbish so washed discharges from the end of the wet screen D and is carried by conveyer $Z^{15}$ to be dumped into rubbish bins $N^1$ after the bones have been removed therefrom, to be mixed with other rubbish to be utilized as fuel in the rubbish destructors $X^2$. The tankage passing from containers $Z^7$ into the centrifugal pump $Z^8$ is thereby agitated, which will disintegrate the solids and enable the grease to free itself from the same as it discharges into the settling and trap tanks $F^1$. This treatment does away with the necessity of dry disintegration, as heretofore explained.

The trap tanks $F^1$ are filled to the domes $F^2$ by the discharge from the pump $Z^8$. Heat having been applied through the steam coils $F^{12}$ at the bottom of the tanks $F^1$ to raise the temperature to a given point. Then the contents are allowed to settle and clear grease is forced from domes $F^2$ through the pipe $F^8$ into the grease-settling tanks $F^4$. All valves are then closed and air is applied at the top of tank $F^1$ by opening air valve $T^{10}$ and when the valve $T^{15}$ is opened, liquor, when clear, may be discharged through pipe T into the return hot liquor tank $F^7$ to supply return hot liquor through pipe $T^4$ to hot-water tank C. The clear liquor from trap tanks $F^1$ having been drawn off, all valves are closed and air pressure is admitted to pipe $T^6$ by opening valve $T^7$ for the purpose of blowing up and agitating the solid or mud-like matter at the bottom of tank $F^1$. This operation being completed, the contents is then ready to be discharged into the evaporating apparatus S. This is accomplished by closing all valves in the tank F, opening valve $T^8$ in the pipe $T^9$, which leads to the evaporators S and opening air valve $T^{10}$ whereupon the material is forced up into pipe $T^9$ and into the evaporators S.

The grease-settling tanks $F^4$ are provided with steam coils in order that their contents may be heated to separate the grease from the liquor and muck. The grease is drawn off into storage tank $F^5$ through pipe $F^{91}$ and may be drawn from tank $F^5$ through pipe $F^{51}$ in condition for the market. The contents of the muck tank $F^3$ is forced by air pressure into tanks $F^1$ through pipe $F^{31}$ and the liquor in both the tanks $F^4$ and $F^3$ is drawn off into return liquor tanks. The evaporators S are charged with tankage in the liquid state and sealed by closing valve $T^8$ in pipe $T^9$, leading from the settling tanks $F^1$. The double shells of the evaporators are always kept at a high temperature and the lifts therein are continually kept in motion by driving gears $S^2$. A vacuum of about 28" is maintained for about two hours by means of pump $S^3$ reducing the moisture in the material being treated about 60%. The pump $S^3$ is then shut off and the vacuum lost. Discharge doors, not shown, in the bottom of the evaporator shell are opened through doorways $S^4$ in the hopper casing chutes $S^5$ so as to empty the contents of evaporator into conveyer W by opening slide gates $W^1$, one at a time, so as to continuously feed an even quantity of moist tankage through conveyer W to conveyer $W^4$. Conveyer $W^4$ delivers to conveyer $W^2$ and $W^3$, all of which are screw-conveyers inclosed in air-tight casings. The last-named conveyers deliver the tankage into hot air driers V and the tankage passing continuously through said driers is delivered into conveyer $V^2$ which in turn delivers the same to conveyer $P^5$ in condition to be marketed as fertilizer.

The operation of hot air driers V is continuous and confined, the wet tankage being fed at the highest temperature of the heat (about 600°). The inlets for heat into the cylinder of said driers are so arranged that the temperature is decreased as the tankage travels to the discharge end of the drier so that the vapor, as exhausted at the feed end by the draft caused by fans $V^5$, does not exceed a temperature of 140° as it passes to coolers and condensers $V^6$ where all gases are taken up by the condensers, the water passing to the sewer and the exhaust air is discharged by one of the fans $V^5$ into the chimney $V^9$.

A complete drying could be accomplished in the vacuum drier in five hours, leaving the tankage with 3% of moisture, but I have found that in the first two hours' operation the moisture will be reduced to 60%, evaporating 18 lbs. of water with one lb. of coal and consuming five horse power for driving. However, after the first two hours' operation the evaporation falls off rapidly and after five hours only 12 lbs. of water can be evaporated with one lb. of coal and the power required for driving increases to 25 horse power. For this reason I prefer to do the preliminary drying in the evaporators and finish the same in the driers V.

The boilers P may be operated by any suitable fuel but as herein shown rubbish principally is utilized. Special rubbish destructors $X^2$ are provided for the utilization of this material. The rubbish received is delivered into bin $N^1$ as well as the rubbish separated in the revolving screen D and which is delivered by conveyer $X^{13}$ is fed into chargers $X^9$ on to the grates of the rubbish destructors $X^2$.

The working of the process in detail from the start to the delivery of the merchantable product is continuous and confined. This is a very important and valuable part of my process and makes it unobjectionable to operate. By the present arrangement the same will be free from objectionable odors since I have shown positive connections throughout between each apparatus which connections are never disturbed excepting in case of repairs, it being my aim to prevent absolutely the escape of any of the odors or the material in its transit from one apparatus to another. The ventilation which prevents the escape of odors provides a vent for each vessel into which materials are discharged. All chutes, tanks and incased apparatus have draft pipes leading to a main ventilating pipe $V^7$ which discharges into coolers and condensers $V^6$. The fans $V^5$ exhaust the air from coolers and condensers and discharge the same into the chimney $V^9$. The main supply of fresh air comes in just under the roofs and floors of the buildings in which the apparatus is installed and thus each room in the buildings will be amply supplied with fresh air, the draft pipe in the same being also connected to the main ventilating pipe $V^7$. The digesters and extractors, as well as all tanks and piping where necessary, are constructed of a special gun metal to resist the action of acids or other corrosives.

By my improved "continuous and confined method" I am able to remove much more grease from a given quantity of garbage and other matter than formerly on account of the separation of the extraneous matter from the tankage and liquor at the point indicated and this is therefore a very important factor. The separation is accomplished by admitting the large quantity of hot liquor at the extractor, thereby removing the very valuable matter from the rubbish.

After the process is once started there is no additional water added in carrying the process through. Only such liquor as is contained in the green garbage is charged into the digesters and the water of condensation which is created by the direct steam used for cooking in the digesters, other heating being done by coils as described. There is no fresh water used, the surplus being evaporated in the driers at different periods while drying the pulpy-like material or tankage, therefore, instead of performing the operations with hot water, hot liquor which has a value in ammonia and other chemicals adapted for fertilizing is utilized and for that reason the surplus acquired is evaporated. Furthermore, to extract grease from any kind of tankage or substance it is necessary that a temperature of at least 160° F. be maintained. The process being "continuous and confined" makes it possible to keep the temperature up to almost 200°, about the temperature it would leave the extractor, having left the digester at 212°. It will, therefore, be readily apparent that my improved process will make a great saving in labor, fuel and maintenance by carrying the material through in a liquid state and at a high temperature.

I do not wish to confine the invention to the treatment of garbage, as the same may be applied to the treatment of other matter, such as is found in packing houses, fish oil refineries, etc.

Having thus described my invention, what I claim is:

1. The herein described process for the reduction of garbage, offal or like material containing extraneous matter which comprises cooking the material in a suitable container, withdrawing oil or grease set free in said container during the cooking operation, rejecting the extraneous matter contained in the cooked mixture, disintegrating and treating the remaining pulp-like material to successively remove oil, grease, etc., and part of the liquor freed therefrom, the material being confined in substantially air-tight mechanisms during the foregoing steps.

2. The herein described process of treating matter containing grease or oil which comprises cooking a mass containing raw garbage and extraneous matter, separating the extraneous matter from said cooked garbage, and adding suitable liquor to said garbage and extraneous matter during the separating step to convert said garbage into a pulp so that it will readily separate from the extraneous matter.

3. The herein described process of treating garbage, offal or matter containing grease and rubbish comprising cooking the material under steam pressure, withdrawing oil or grease liberated by the cooking operation, adding to the cooked material, while passing it through a separator adapted to remove rubbish therefrom, sufficient hot spent liquor to convert said material into a pulp-like material, treating the pulp to successively remove oil or grease and free water therefrom, drying the residue and evaporating the accumulated spent hot liquor, the several operations being performed in a continuous manner while the material is confined in apparatus preventing escape of noxious gases, dust, etc.

4. The herein described process of treating garbage, offal or matter containing grease and rubbish, comprising cooking the material under steam pressure, withdrawing oil or grease liberated by the cooking operation, adding to the cooked material, while passing it through a separator adapted to remove rubbish therefrom, sufficient return hot liquor to convert said material into a pulp-like material, heating the pulp and allowing it to settle in a tank, successively withdrawing oil or grease, clear liquor and the solid material from the tank, drying the latter, and evaporating the surplus hot liquor in drying the said solid material.

5. The herein described process of treating garbage or offal containing grease and rubbish, comprising cooking the material under steam pressure, withdrawing oil or grease liberated by the cooking operation, adding to the cooked material, while passing it through a separator adapted to remove rubbish therefrom, sufficient return hot liquor to convert said material into a pulp-like material, heating the pulp and allowing it to settle in a tank, successively withdrawing oil or grease and clear liquor from the tank and withdrawing and drying the residue.

6. The herein described process of treating garbage or offal containing grease and rubbish, comprising cooking the material under steam pressure, withdrawing oil or grease liberated by the cooking operation, adding to the cooked material, while passing it through a separator adapted to remove rubbish therefrom, sufficient return hot liquor to convert said material into a pulp, disintegrating the solid matter and introducing said pulp and liquor into a tank, washing the rubbish escaping from said separator, conducting the wash water to said tank, heating the contents of the tank, successively withdrawing oil or grease and clear hot liquor from the tank, and withdrawing the solid material from the tank and drying it by evaporating the surplus hot liquor.

7. The herein described process for the treatment of materials containing oil, grease, etc., and extraneous matter which comprises cooking the material, withdrawing free oil or grease liberated during the cooking operation, separating the extraneous matter from the oil and grease bearing material and adding suitable hot liquor during said separating step to convert the oil and grease bearing material into a pulp-like mass and to free the extraneous matter of substantially all the oil and grease bearing material, and extracting grease and oil from the pulp-like mass.

8. The herein described process for the reduction of garbage, offal or like material, which comprises feeding a charge of raw garbage or the like containing rubbish and foreign material to a container, cooking the charge, separating the oil or grease as it is liberated during the cooking operation, rejecting the rubbish and foreign material in the cooked charge and simultaneously adding sufficient suitable hot liquor to the cooked charge to free the rubbish and foreign material of all oil bearing matter, thereby converting the remainder of the cooked charge into a mass of pulp-like consistency so that it may be readily conducted to subsequent treating apparatus.

9. The herein described process for the reduction of garbage and other material containing grease or oil and extraneous matter, which comprises adding hot liquor to the material, cooking the mixture under steam pressure, withdrawing grease or oil set free by the cooking operation, separating the extraneous matter from the pulp-like material of said mixture, and simultaneously adding sufficient suitable liquid to substantially free the extraneous matter of all oil or grease bearing garbage, reheating the pulp-like material, allowing the pulp to settle, successively removing oil or grease and free liquor, and drying the remaining pulp-like material.

10. The herein described process for the reduction of garbage, offal or like material containing grease or oil and rubbish, which comprises adding hot liquor to the material, cooking the mixture under steam pressure, withdrawing grease or oil set free by the cooking operation, separating the rubbish from the mixture, washing the rubbish to remove adhering matter therefrom and including the wash water with the material and liquor first separated from the rubbish, the resulting mixture being of a pulp-like consistency, heating the pulp-like matter to further remove oil or grease therefrom, allowing the same to settle, withdrawing the oil or grease set free, returning the clear hot liquor for reuse, withdrawing the pulp-like material, evaporating the surplus hot liquor while drying the said pulp or solid material so as to incorporate the chemicals in each into a fertilizing substance.

In testimony whereof I affix my signature in presence of two witnesses.

CHARLES S. WHEELWRIGHT.

Witnesses:
MABEL R. CAPWELL.
PATRICK P. CURRAN.